United States Patent [19]

Skole

[11] Patent Number: 5,327,706
[45] Date of Patent: Jul. 12, 1994

[54] PACKING MACHINE FOR PACKING BALES OF STRAW FODDER

[75] Inventor: Knud Skole, Risor, Norway

[73] Assignee: Tellefsdal A/S, Fiane, Norway

[21] Appl. No.: 978,889

[22] Filed: Nov. 19, 1992

[30] Foreign Application Priority Data

Nov. 22, 1991 [NO] Norway .................. 914583

[51] Int. Cl.⁵ .............................. S65B 27/12
[52] U.S. Cl. ....................... 53/587; 53/211
[58] Field of Search ............ 53/118, 210, 211, 214, 53/215, 216, 556, 587, 588; 100/15; 414/754, 757

[56] References Cited

U.S. PATENT DOCUMENTS

| | | | |
|---|---|---|---|
| 4,150,756 | 4/1979 | Butler | 414/757 X |
| 4,598,534 | 7/1986 | Rosenthal et al. | 53/588 |
| 4,912,911 | 4/1990 | Down | 53/587 X |
| 5,042,225 | 8/1991 | Drury et al. | 53/587 X |
| 5,129,215 | 7/1992 | Gratton | 53/587 |

FOREIGN PATENT DOCUMENTS

| | | |
|---|---|---|
| 0208034 | 1/1987 | European Pat. Off. . |
| 2430633 | 1/1976 | Fed. Rep. of Germany ...... 414/757 |
| 9004354 | 8/1990 | Fed. Rep. of Germany . |
| 165536 | 11/1990 | Norway . |
| 9113540 | 9/1991 | PCT Int'l Appl. . |
| 2191984 | 12/1987 | United Kingdom . |

*Primary Examiner*—John Sipos
*Assistant Examiner*—Linda B. Johnson
*Attorney, Agent, or Firm*—Cushman, Darby & Cushman

[57] ABSTRACT

In machine, optionally an attachment for a packing machine, for packing bales of straw fodder of a "rectangular" form, plastic sheeting is deposited in layers or overlapping around the straw fodder bale. The packing machine has two drive rollers which rotate the bale around a substantially horizontal axis. Each drive roller is connected operationally to two auxiliary rollers, both of which are able to engage with the fodder bale. The three rollers are mounted in a roller unit in such a way that each roller is in a predetermined spaced relationship to the others. The roller units are mounted on the center axis of the drive roller so as to be revolvable, and two such spaced apart roller units when in operation are able to turn a rectangular bale of straw fodder through 360° around the horizontal axis.

9 Claims, 4 Drawing Sheets

PACKING MACHINE FOR PACKING BALES OF STRAW FODDER

BACKGROUND OF THE INVENTION

The present invention relates to a packing machine, optionally an attachment for a packing machine, for packing bales of straw fodder of a "rectangular" form, wherein plastic sheeting is deposited in layers or overlapping around the straw fodder bale, the machine comprising two drive rollers which rotate the straw fodder bale around a substantially horizontal axis.

In agriculture, it is becoming more and more common to ensile straw fodder in the form of packed straw fodder bales. There is a movement away from the traditional silo plant. This method of ensilage, which has gradually become well known, has taken place in that the fodder, such as grass or straw, has been packed in round bales. Thereafter sheeting, preferably plastic sheeting, is wrapped around the bales, thus they can be stored outdoors without any problems, and the ensilage can take place inside a thus virtually hermetically packed bale. This has reduced the work connected with fodder considerably, and has also given rise to advantageous gains for the environment, as the leakage of silage fluids has virtually ceased and the use of chemicals has been greatly reduced.

Norwegian Patent 159366 makes known a packing machine (see FIG. 5) which packs straw fodder bales, often called round bales, which, broadly speaking, have in fact the form of a short cylinder. The round bale lies on two substantially parallel running rollers which are spaced apart from one another at a distance which is less than the diameter of the round bale. The rollers are operated rotationally and cause the bale to rotate around a substantially horizontal axis. The packing machine also has a superjacent crank mechanism which carries a vertically positioned roll of stretchable, adhesive plastic sheeting. The plastic sheeting is moved in a horizontal path around the fodder bale at the height of the center line of said fodder bale. When the drive rollers rotate the round bale around their horizontal axis at the same time as the crank mechanism moves the sheeting in said horizontal path, the plastic sheeting is wrapped in layers or overlapping around the round bale, and packs it almost hermetically. A packing machine of this kind can be stationary, per se, but in a practical embodiment which is already on the market, the packing machine is designed for rapid connection to a tractor, either mounted at the front or at the back. The power outlet of the tractor may be used for the whole of, or parts of, the operation.

Norwegian Patent 165536 makes known another kind of round bale packer which is mounted on an undercarriage on wheels. Here, too, the round bale is supported by two parallel running and spaced apart rollers which cause the round bale to rotate around a substantially horizontal axis. The rollers are positioned on a swivel table which can rotate in relation to the undercarriage in such a way that the round bale can also rotate around a substantially vertical axis. Fixed in a stationary manner to the undercarriage is a roll of plastic sheeting which, after being attached to the bale, is wrapped around said bale in layers or overlapping when the round bale is rotated around its two axes. Furthermore, the rollers can be tipped in relation to the undercarriage so that the round bale rolls off therefrom.

A similar round bale packer is also known from GB Application 2191984 and EP Application No. 0208034.

It has been established that in some countries equipment already exists which packs the straw fodder bales in an almost "rectangular" form. What is described by this term is a form which is almost parallelepiped and cube-shaped. The known packing machines referred to above are not capable of handling straw fodder bales of a rectangular form, only those of the conventional cylindrical form. There has been a need to be able to pack these rectangular straw fodder bales in a similar manner as the cylindrical bales.

SUMMARY OF THE INVENTION

An objective of the present invention is to provide either a new complete packing machine, or optionally an attachment which can be mounted subsequently on machines which already exist, for packing bales of straw fodder which are rectangular in form. It is important to understand that the attachment can be mounted subsequently for packing rectangular bales on both of the main kinds of packing machines which have been referred to hereinabove.

According to the invention, this is achieved by a packing machine, or optionally an attachment thereto, of the kind described by way of introduction which is characterized in that each drive roller is operationally coupled to two auxiliary rollers, both of which can engage with the fodder bale, the three rollers being mounted in a roller unit in such a way that each roller is in a predetermined spaced relationship from the others, the roller unit being rotatably prestressed and mounted so as to be revolvable around the centre axis of the drive roller, so that two such spaced roller units in operation are able to turn a rectangular bale through 360° around the substantially horizontal axis.

As mentioned, the machine may be of the kind with a swivel arm or a crank mechanism, wherein the swivel arm feeds the plastic sheeting and draws it around the straw bale as the swivel arm moves in a horizontal path of motion.

Alternatively, the machine can be of the kind which has a swivel table (FIG. 6) which, in addition to rotating the bale around a substantially horizontal axis, also rotates the bale around a substantially vertical axis.

It would be advantageous for the surfaces of the auxiliary rollers to be provided with grooves or grab teeth so that slipping against the bale is avoided.

The roller units are advantageously movable towards and away from one another in a substantially horizontal direction, so that the machine can be adapted to different bale sizes, as well as have the ability of picking up a bale which is lying on the ground.

The auxiliary rollers can expediently be driven by the drive roller by means of chain drive.

BRIEF DESCRIPTION OF THE DRAWINGS

The invention will now be described in more detail by means of an embodiment example where the machine is of the kind which is equipped with a swivel arm. The embodiment example is described with reference to the enclosed drawings where.

DETAILED DESCRIPTION

Figure 1:
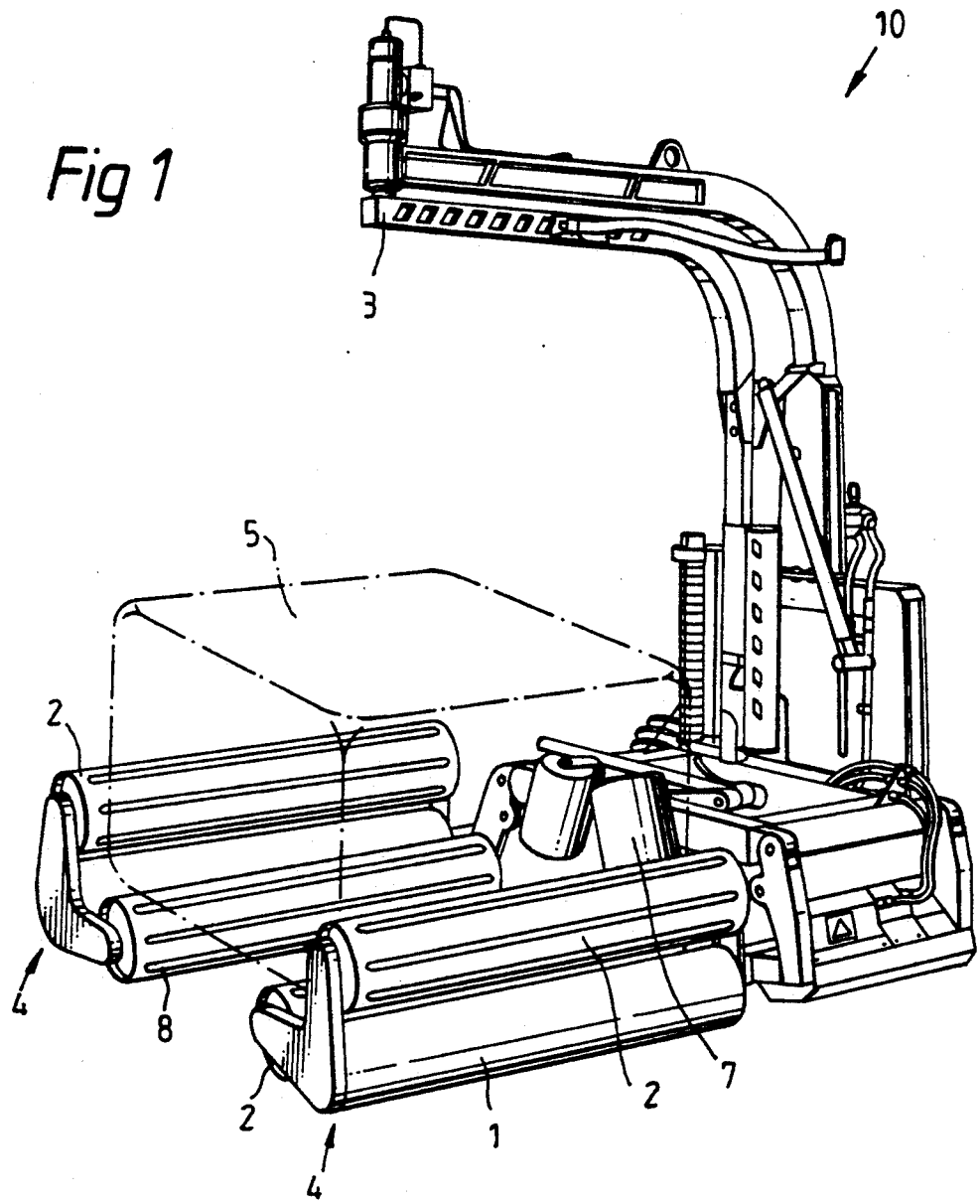
FIG. 1 shows in perspective a packing machine according to the invention in perspective.

Reference is made to FIG. 1 which shows a packing machine 10 of the type having a swivel arm 3, also called a crank mechanism. A bale of straw fodder 5 of a "rectangular", i.e., parallelepipedic, form is indicated on the drawing with broken lines. The straw fodder bale 5 rests upon two spaced apart roller units 4. The distance between the roller units 4 is adapted to the longitudinal or lateral extent of the straw bale 5. Each roller unit 4 comprises a drive roller 1 and two auxiliary rollers 2. The auxiliary rollers 2 are driven to rotate by the drive roller 1. This can be effected by means of, for example, a chain drive, belt drive, direct cogwheel transmission or friction roller transmission. In the embodiment depicted, each auxiliary roller 2 has grooves 8, but these may, of course, be replaced by grab teeth, or optionally a suitable friction coating. This shall prevent the auxiliary rollers from slipping against the straw fodder bale 5. It is intended that the drive roller itself should not touch the straw fodder bale 5.

The packing machine uses a roll of plastic sheeting which is mounted on the swivel arm 3 in such a way that it can brought into a horizontal path at the height of the fodder bale and be drawn around said bale at the same time as said fodder bale 5 rotates. The plastic sheeting is, however, not shown on FIGS. 1-5, and in that respect reference is made to on FIG. 6 and to Norwegian Patent 159366, referred to previously.

On the back edge of the roller units 4, two support rollers are mounted, to which the fodder bale 5 rests adjacent at the back edge.

Figure 2:
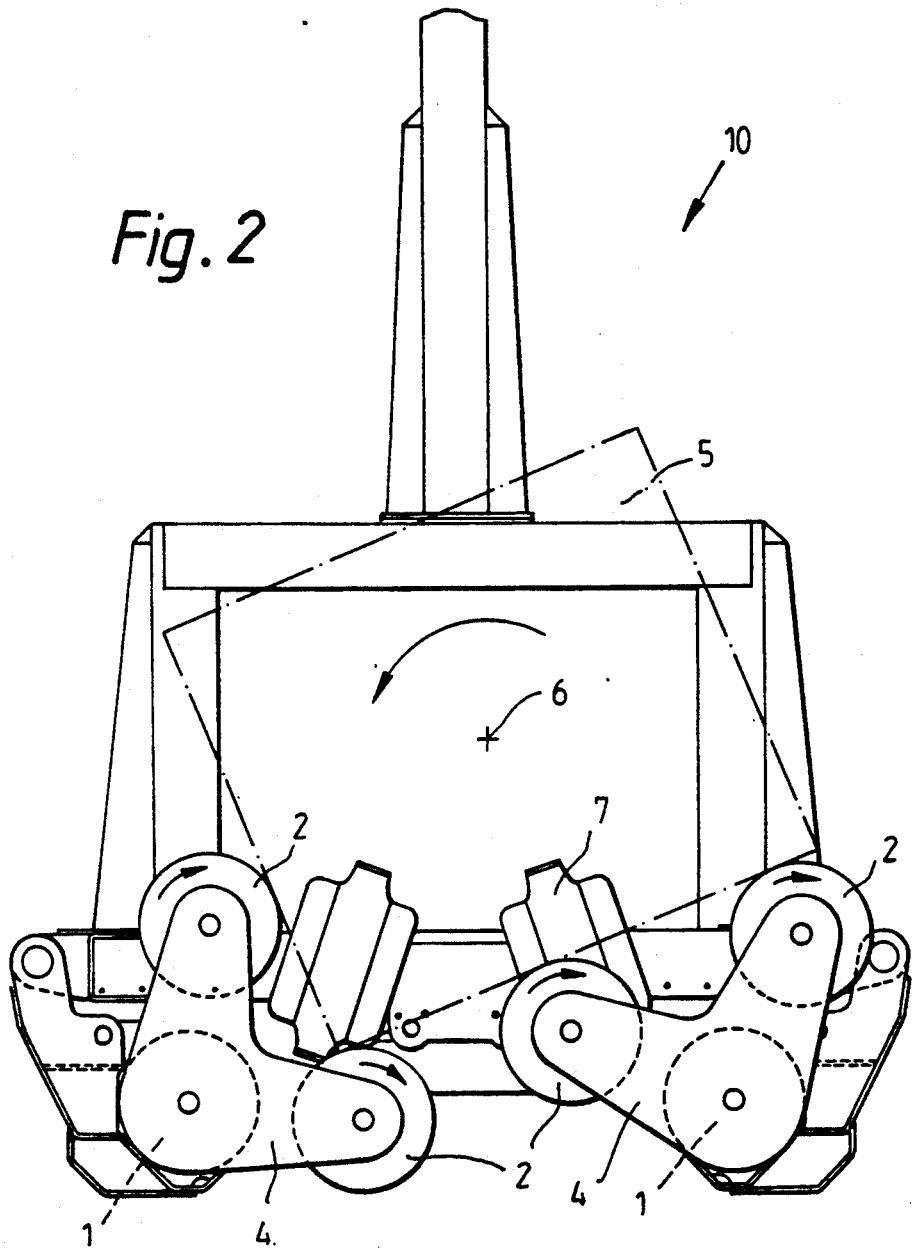
FIG. 2 shows a schematic frontal outline of the packing machine according to FIG. 1.

FIG. 2 illustrates schematically the packing machine 10 viewed from the front where the straw fodder bale 5 has started its rotational movement. As can be seen from the figure, the fodder bale 5 rests, in this phase, on the all the auxiliary rollers 2. The roller units 4 are, as shown, also rotatable around the axis of the drive roller 1. This rotational movement goes beyond or is restricted to turning through a certain predetermined angle. The roller units 4 are also prestressed in the sense that said rotational movement around the axis of the drive roller takes place against a certain pretension, so that the roller unit 4, without the load of a fodder bale 5, will be forced around said axis in an anticlockwise direction in the right-hand roller unit and in a clockwise direction in the left-hand roller unit in FIG. 2. The roller units 4 can also be driven towards and away from one another horizontally in order to be able to handle bales of different sizes.

Figure 3:
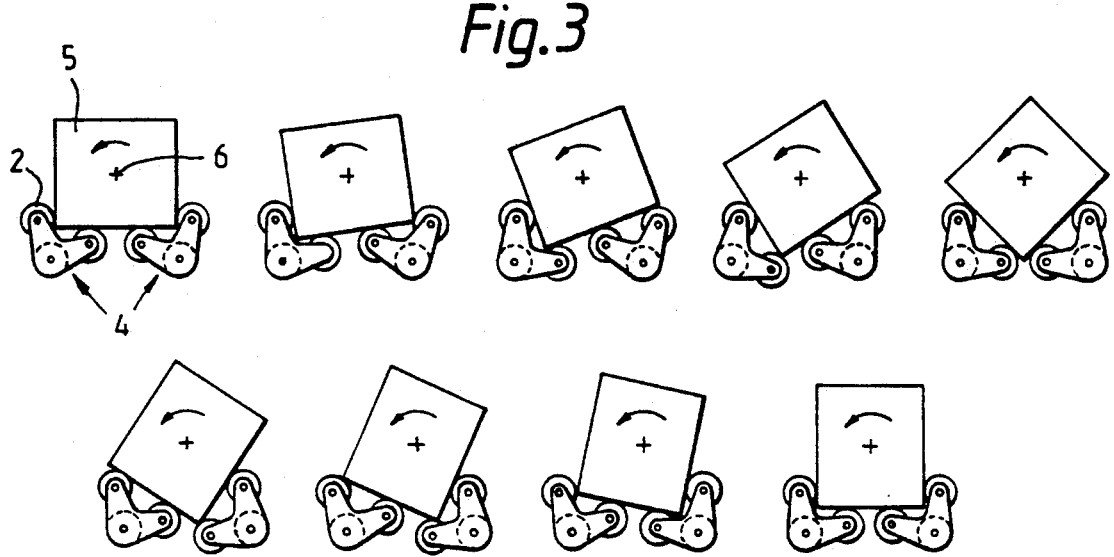
FIG. 3 shows schematically a rotation sequence of the rectangular bale around the horizontal axis.

FIG. 3 shows a rotational sequence through the first 90° of the turning movement of the rectangular bale. This also shows how the roller units 4 work the whole time during the turning of the rectangular bale. The figure is schematic and it shall be understood that the auxiliary rollers 2 at times are pressed more or less into the rectangular bale, or possibly have no contact at all. As can be seen, the direction of rotation for all four auxiliary rollers 2 is the same. This rotation of the rollers 2 and the prestressed independent rotational movement of each separate roller unit 4 causes the turning of the rectangular bale without it being dispatched from the roller units. A prototype has been constructed, and trials show that this functions extremely well in practice.

Figure 4:
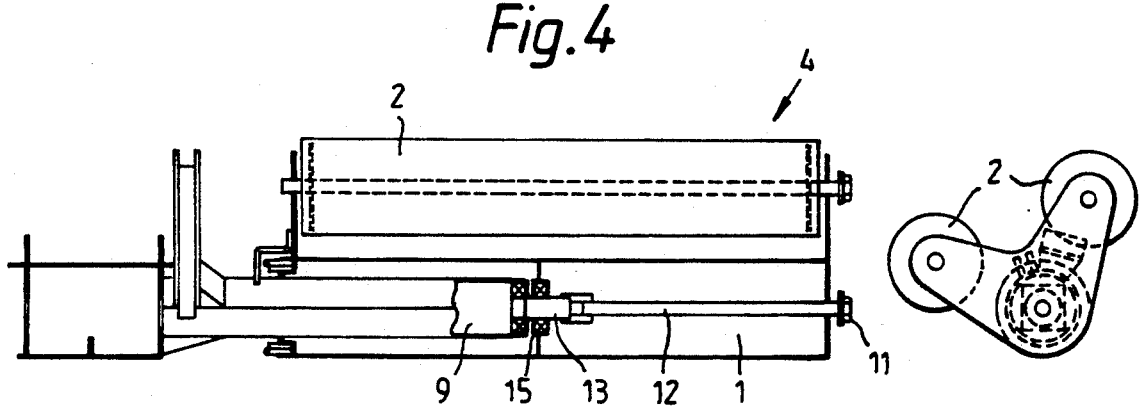
FIG. 4 shows a longitudinal section through the drive roller and the auxiliary roller and an end section of the roller unit.

FIG. 4 shows a longitudinal section through the drive roller 1 and the auxiliary roller 2. At the end of each roller, a chain wheel 11 is mounted for the transmission of power to the auxiliary rollers 2. A cover may in turn be placed over the power transmission or the illustrated chain transmission. In one embodiment the drive roller 1 is stationary, i.e., the outer surface thereof remains stationary, whilst the operation takes place inside the roller from a hydraulic engine 9, via an intermediate shaft 12 to the chain wheel 11. The output shaft journal 13 of the hydraulic engine 9 is advantageously mounted 15 inside the roller 1, e.g., in the central part thereof.

Figure 5:
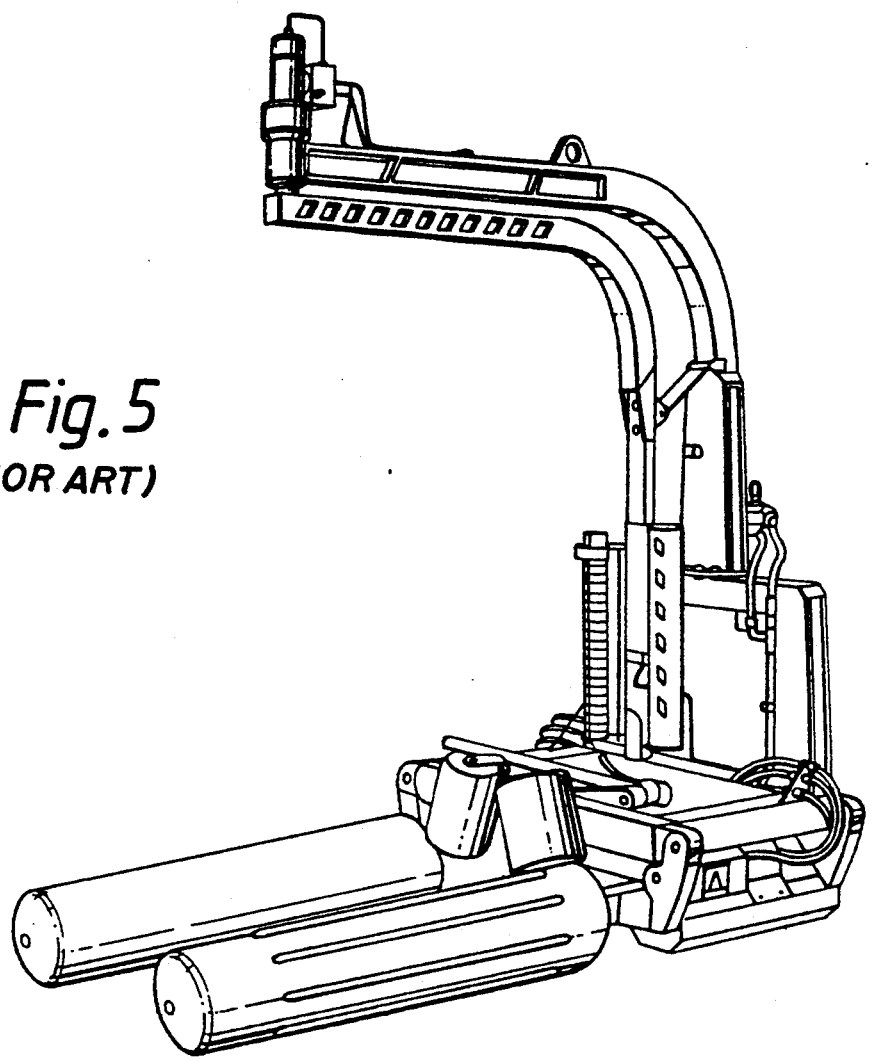
FIG. 5 depicts the previously known packing machine of the kind which has a swivel arm.
Figure 6:
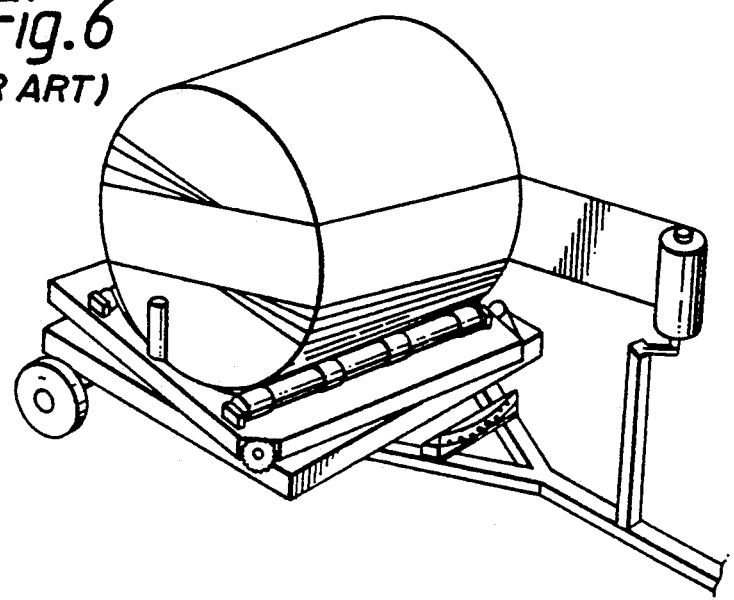
FIG. 6 depicts the previously known packing machine of the kind which has a swivel table.

FIG. 5 shows, as mentioned, a previously known packing machine of the kind having a swivel arm. Correspondingly, FIG. 6 depicts a packing machine of the kind having a swivel table. These are shown to illustrate that the roller units 4 can replace the previous drive rollers on existing packing machines, and thus be a subsequently mountable attachment for these earlier packing machines. Thus previously known packing machines can be converted to machines which can handle rectangular bales of straw fodder.

I claim:

1. A packing machine apparatus for packing a bale of straw fodder of parallelepipedic form, wherein plastic sheeting is disposed in layers or overlapping around said straw fodder bale, comprising:

two drive rollers which are mounted to rotate a parallelepipedic bale of straw fodder around a substantially horizontal axis;

each drive roller having a center axis and being operationally connected to a respective two auxiliary rollers, both of which have outer peripheral surfaces for engaging said fodder bale, each said driver roller and respective two operationally connected auxiliary rollers being mounted in a respective roller unit in such a way that each roller of the respective unit is in a predetermined spaced relationship to the other said rollers of the same said unit, means for rotatably prestressing and mounting each said unit on the center axis of the respective drive roller so as to be revolvable, said roller units being spaced apart when in operation and arranged to turn said bale through 360° around said substantially horizontal axis; and means for applying plastic sheeting upon said bale.

2. The packing machine apparatus according to claim 1, further including:

a swivel arm, which swivel arm feeds plastic sheeting and stretches said plastic sheeting around the bale as said bale is being rotated around said axis by said roller units, said swivel arm being mounted to move on a substantially horizontal path of motion for feeding and stretching said plastic sheeting.

3. The packing machine apparatus according to claim 1, further including:

a swivel table, which, as said units rotate the bale around a substantially horizontal axis, also rotates the bale around a substantially vertical axis.

4. The packing machine apparatus according to claim 1 wherein:

there are frictional grip-enhancing features provided on said outer peripheral surfaces of the auxiliary rollers.

5. The packing machine apparatus according to claim 1, wherein:

the roller units are supported to be moved towards and away from one another in a substantially horizontal direction.

6. The packing machine apparatus according to claim 1, wherein:

the auxiliary rollers are mounted in respective of said units each to be rotatably driven by the respective said drive roller by means of a mechanical transmission.

7. The packing machine apparatus according to claim 6, wherein:

each said drive roller has an outer peripheral surface which is externally rotationally stationary in use and drive is transmitted only internally in each said driver roller.

8. The packing machine apparatus according to claim 6, wherein:

said transmissions rotate said auxiliary rollers in each said unit at a same rate of rotation.

9. The packing machine apparatus according to claim 6, further including:

a swivel table, which, as said units rotate the bale around a substantially horizontal axis, also rotates the bale around a substantially vertical axis, and wherein: said transmissions rotate said auxiliary rollers in each said unit at a same rate of rotation.

* * * * *